United States Patent
Gross et al.

(10) Patent No.: US 6,675,013 B1
(45) Date of Patent: Jan. 6, 2004

(54) DOPPLER CORRECTION AND PATH LOSS COMPENSATION FOR AIRBORNE CELLULAR SYSTEM

(75) Inventors: Jonathan H. Gross, Gilbert, AZ (US); Thomas Peter Emmons, Jr., Mesa, AZ (US); Scott C. White, Mesa, AZ (US); Duke E. Hanson, Queen Creek, AZ (US)

(73) Assignee: Motorola, Inc., Schaumburg, IL (US)

( * ) Notice: Subject to any disclaimer, the term of this patent is extended or adjusted under 35 U.S.C. 154(b) by 565 days.

(21) Appl. No.: 09/605,144

(22) Filed: Jun. 26, 2000

(51) Int. Cl.$^7$ ................................................. H04Q 7/20
(52) U.S. Cl. .................... 455/431; 455/67.13; 455/12.1; 455/11.1; 455/13.1
(58) Field of Search .............................. 455/13.1, 12.1, 455/11.1, 516, 431; 340/827; 342/175, 352; 370/315, 316

(56) References Cited

U.S. PATENT DOCUMENTS

| | | |
|---|---|---|
| 2,598,064 A | 5/1952 | Lindenblad |
| 2,626,348 A | 1/1953 | Nobles |
| 2,627,021 A | 1/1953 | Hansell et al. |
| 2,748,266 A | 5/1956 | Boyd |
| 3,866,227 A | 2/1975 | Ruvin |
| 5,063,387 A | 11/1991 | Mower |
| 5,067,172 A | 11/1991 | Schloemer |

(List continued on next page.)

FOREIGN PATENT DOCUMENTS

| | | |
|---|---|---|
| EP | 0 421 704 A2 | 4/1991 |
| EP | 0 618 704 A1 | 10/1994 |
| EP | 0 789 498 A2 | 8/1997 |
| EP | 0 803 742 A2 | 10/1997 |
| EP | 0 837 567 A2 | 10/1997 |
| EP | 0901240 | 3/1999 |
| EP | 0 939 569 A1 | 9/1999 |

(List continued on next page.)

OTHER PUBLICATIONS

"51.84 Mbps Airborne Wireless Experiments: A Prelude to the Emerging HALO ™ Communication Technology", 1999, Jon Aasterud et al.

"Establishing Wireless Communications Services via High–Altitude Aeronautical Platforms: A Concept Whose Time Has Come?" Djuknic et al., IEEE Communications Magazine, Sep. 1, 1997, pp. 128–135.

"On the Use of HALE Platforms as GSM Base Stations", IEEE Personal Communications, Apr. 2001, vol. 8 No. 2, pp. 37–43.

"Relay Aircraft Enable Cell 'Network in the Sky'", William B. Scott, Aviation Week andS Space Technology, Jun. 29, 1998, pp. 22–23.

(List continued on next page.)

*Primary Examiner*—Sinh Tran
*Assistant Examiner*—Temica M. Davis
(74) *Attorney, Agent, or Firm*—Charles W. Bethards; Frank J. Bogacz

(57) ABSTRACT

The present invention corrects for Doppler shift in both forward and reverse links in a cellular communications system including an airborne repeater. A reverse link pilot reference signal in a band similar to a communications signal band is received at a reverse link processor, and the Doppler shift in the reverse feeder link is corrected based on the reverse link pilot reference signal. The Doppler shift in the forward feeder link is also corrected based on the reverse link pilot reference signal prior to the forward feeder link being affected by the Doppler shift. The present invention also compensates for signal strength variations due to changing flight pattern positions of the repeater. Pre-compensation for forward feeder link path losses due to movement of the airplane is performed to cause communications signals transmitted to and from the cellular communications system repeater to have identical strength before the signals are transmitted to the system user cell phones within the area of coverage.

17 Claims, 5 Drawing Sheets

U.S. PATENT DOCUMENTS

| | | | |
|---|---|---|---|
| 5,123,112 A | | 6/1992 | Choate |
| 5,187,805 A | | 2/1993 | Bertiger et al. |
| 5,455,964 A | * | 10/1995 | Roos .......................... 455/516 |
| 5,479,482 A | | 12/1995 | Grimes |
| 5,530,909 A | | 6/1996 | Simon et al. |
| 5,548,292 A | | 8/1996 | Hirschfield et al. |
| 5,557,656 A | | 9/1996 | Ray et al. |
| 5,559,865 A | | 9/1996 | Gilhousen |
| 5,574,968 A | | 11/1996 | Olds et al. |
| 5,613,193 A | * | 3/1997 | Ishikawa et al. ........... 455/12.1 |
| 5,619,211 A | | 4/1997 | Horkin et al. |
| 5,625,867 A | | 4/1997 | Rouffet et al. |
| 5,657,032 A | | 8/1997 | Liechty et al. |
| 5,678,184 A | | 10/1997 | Cutler, Jr. et al. |
| 5,703,595 A | * | 12/1997 | Tayloe et al. ............... 342/175 |
| 5,774,790 A | | 6/1998 | Dupuy |
| 5,790,939 A | | 8/1998 | Malcolm et al. |
| 5,832,380 A | | 11/1998 | Ray et al. |
| 5,867,109 A | * | 2/1999 | Wiedeman .................. 340/827 |
| 5,874,913 A | * | 2/1999 | Blanchard et al. .......... 342/352 |
| 5,890,079 A | | 3/1999 | Levine |
| 5,937,349 A | | 8/1999 | Andresen |
| 5,974,349 A | | 10/1999 | Levine |
| 6,006,084 A | | 12/1999 | Miller et al. |
| 6,018,659 A | | 1/2000 | Ayyagari et al. |
| 6,058,306 A | * | 5/2000 | Liu ........................... 455/427 |
| 6,061,561 A | | 5/2000 | Alanara et al. |
| 6,061,562 A | | 5/2000 | Martin et al. |
| 6,072,428 A | | 6/2000 | Schipper et al. |
| 6,073,004 A | | 6/2000 | Balachandran |
| 6,127,946 A | | 10/2000 | Tzidon et al. |
| 6,246,960 B1 | * | 6/2001 | Lin ............................ 701/214 |
| 6,285,878 B1 | | 9/2001 | Lai |
| 6,324,398 B1 | | 11/2001 | Lanzerotti et al. |
| 6,430,391 B1 | * | 8/2002 | Dent et al. ................. 455/11.1 |

FOREIGN PATENT DOCUMENTS

| | | |
|---|---|---|
| FR | 2757331 | 12/1996 |
| GB | 2318948 A | 5/1998 |
| GB | 2 320 992 A | 7/1998 |
| JP | 310426 A2 | 5/1991 |
| WO | WO 95 04407 | 2/1995 |
| WO | WO 96 02094 | 1/1996 |
| WO | WO 96 16489 | 5/1996 |
| WO | WO 97 07609 | 2/1997 |
| WO | WO 97 19525 | 5/1997 |
| WO | WO 97 23104 | 6/1997 |
| WO | WO 98 44639 | 10/1998 |
| WO | WO 98 51568 | 11/1998 |
| WO | WO 99 13598 | 3/1999 |
| WO | WO 99 23769 | 5/1999 |
| WO | WO 99 45609 | 9/1999 |
| WO | WO 99 46877 | 9/1999 |
| WO | WO 00 14902 | 3/2000 |

OTHER PUBLICATIONS

"Revised Technical And Operational Parameters For Typical IMT–2000 Terrestrial Systems Using High Altitude Platform Stations And CDMA Radio Transmission Technologies", Radiocommunication Study Groups, Mar. 4, 1999.

Skystation Stratospheric Telecommunication New Payload Description, Mini, Missoni, Pauro, Proceeding of 17 of the AIAA ICSSC, 1997, pp. 235–242.

"Wireless Communication Systems using Stratospheric Platforms", Hase, Technical Report of IEICE, 2000.

"Airborne Relay Communication System"—System Demonstration—public handout at public demonstration, May 1, 1998, 36 pages.

"Concept Overview", Angel Technologies Corporation Web Page Printout, (www.angelcorp.com) , Mar. 1998, 7 pages.

"Hail Hale, the Answers May All Be Here", Thomas W. Will, Ph.D., Joseph N. Pelton, Ph.D., Unmanned Systems Magazine, Winter 1995, pp. 31–34.

"High–Capacity Aerial Vehicles Aid Wireless Communications", Signal Magazine, Apr. 1997, 6 pages.

"Geosynchronous Satellites at 14 Miles Altitude?", Joseph N. Pelton, Ph.D., New Telecom Quarterly, Second Quarter 1995 (2Q95) , pp. 11–16.

* cited by examiner

DOPPLER CORRECTION AND PATH LOSS COMPENSATION FOR AIRBORNE CELLULAR SYSTEM

FIELD OF THE INVENTION

The present invention relates generally to a cellular communications system including an airborne repeater, and particularly to compensation of airborne repeater links.

BACKGROUND OF THE INVENTION

The increasing need for communications networks and capabilities in outlying and geographically diverse locations has created greater demand for cellular systems. Many new carriers providing the infrastructure for such systems have focused their resources on building as many terrestrial cell stations as possible to expand their respective areas of coverage and consequently generate more revenue.

However, the buildout rate for the terrestrial cell stations is typically slow and expensive, especially in mountainous or otherwise difficult to access areas. In addition, in some these areas, a carrier's return on investment may not provide the incentive necessary for the carrier to build the necessary cell stations, thereby leaving these areas with either limited or no cellular service at all. Further, many areas having a sufficient number of cellular communications base transceiving stations to handle calls during both off-peak and peak times cannot adequately handle large volumes of calls during sporting events or other short-term special events that temporarily attract large crowds.

In response to the above, airborne cellular systems have been proposed in which a cellular repeater mounted in an airplane, executing a predetermined flight pattern over a geographic area requiring cellular coverage, links calls from cellular phones within the geographic area to a terrestrial base station. Because the airplane is capable of traversing geographic obstacles and takes the place of the cell stations, such a system overcomes the above-mentioned limitations of conventional terrestrial cellular systems.

Despite its many advantages, an airborne cellular system presents design and implementation problems not present in the design and implementation of conventional terrestrial cellular systems. For example, an airborne cellular system requires both a high frequency feeder link to link the base station and the system switch to the airborne repeater, and a subscriber or user link to link the airborne repeater to cellular phones within the area of coverage. As a consequence of the motion of the airplane relative to the base station or cellular phone, an often significant amount of Doppler shift is introduced on the links. As a cellular system such as a TDMA EIA 136 system is sensitive to Doppler shift characteristics, its performance is degraded generally in proportion to the amount of Doppler shift present.

In addition, as the airborne repeater moves as the plane executes its flight pattern, the communication path link distances between the base station and the airplane and the airplane and the system subscribers constantly change. These changes in path link distances cause signal loss to vary. Also, airplane pitch, roll and yaw can move a beam off of its peak gain, thereby increasing the average power consumption of the repeater and associated equipment, increasing dynamic range requirements and increasing the dynamic range and power consumption of the repeater and associated equipment. Consequently, heavier, more expensive and higher power consumption power amplifiers must be used.

Clearly, a need exists for solutions to the foregoing problems.

BRIEF DESCRIPTION OF THE DRAWINGS

Advantages of the present invention will be readily apparent from the following detailed description of preferred embodiments thereof when taken together with the accompanying drawings in which.

DETAILED DESCRIPTION OF THE PREFERRED EMBODIMENTS

Figure 1:
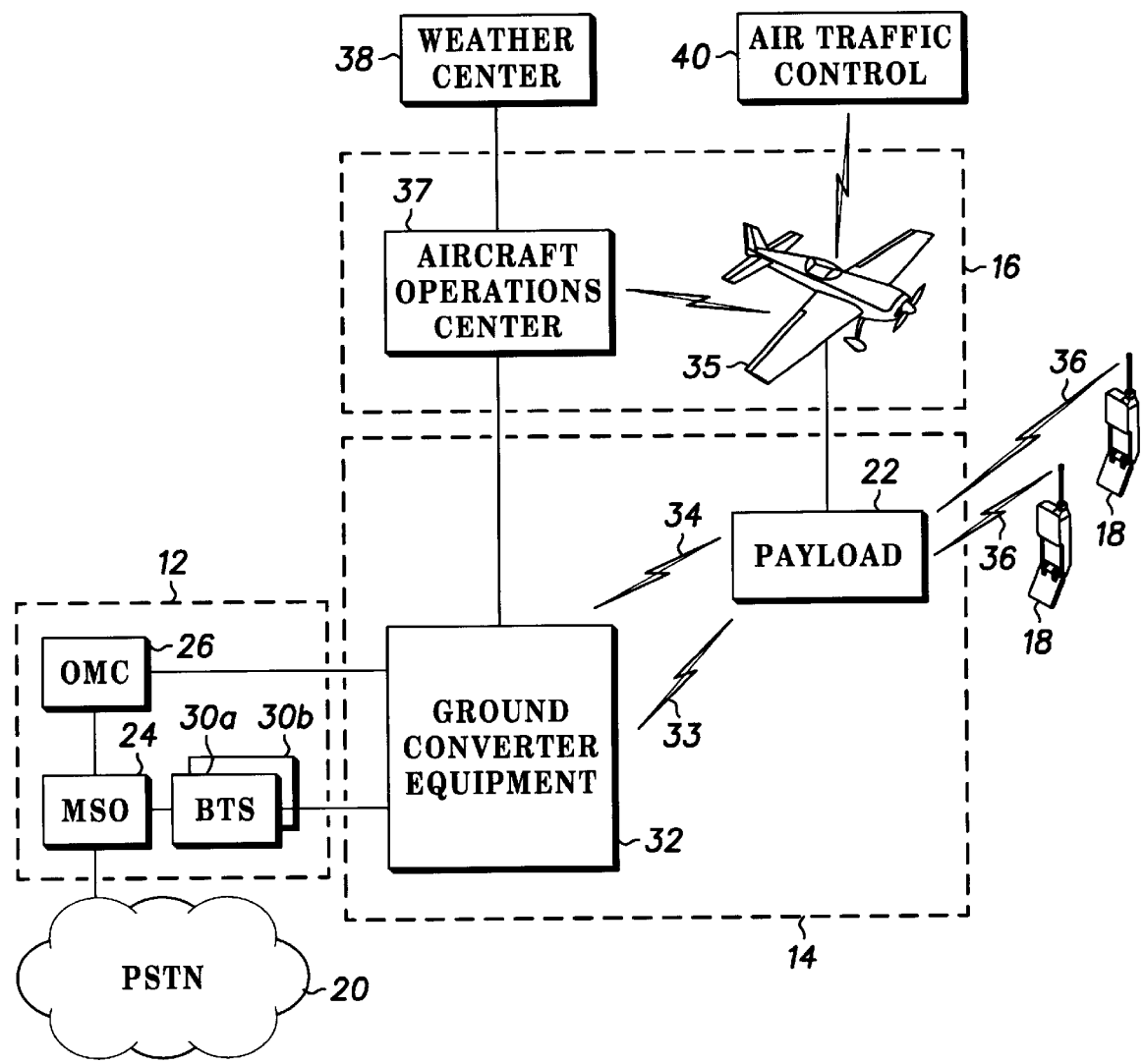
FIG. 1 is a system diagram of an airborne cellular communications system of the type in which Doppler shift is corrected in accordance with the present invention.

Referring now to the drawings in which like numerals reference like parts, FIG. 1 shows an airborne cellular communications system 10. The system 10 generally includes three primary segments: a cellular infrastructure segment 12, a radio infrastructure segment 14, and an airplane segment 16. These three segments in combination are capable of providing cellular communications coverage to a large geographical area by enabling system users, represented generally by handsets 18, to link to a public switched telephone network (PSTN) 20 via an airplane payload 22 including a repeater. The structure and function of each of these three system segments will be discussed in detail.

The cellular infrastructure segment 12 includes a mobile switching office (MSO) 24 that includes equipment, such as a telephony switch, voicemail and message service centers, and other conventional components necessary for cellular service. The MSO 24 connects to the PSTN 20 to send and receive telephone calls in a manner well known in the art. In addition, the MSO 24 is connected to an operations and maintenance center (OMC) 26 from which a cellular system operator manages the cellular infrastructure segment 12. The MSO 24 is also connected to one or more base transceiver stations (BTSs) such as the BTSs shown at 30a, 30b. The BTSs 30a, 30b transmit and receive RF signals from the system users 18 through the radio infrastructure segment 14.

More specifically, the BTSs 30a, 30b transmit and receive RF signals through ground converter equipment 32. The ground converter equipment 32 converts terrestrial cellular format signals to C-band format signals and communicates with the airborne payload 22 through a feeder link 33 and a telemetry link 34, each of which will be discussed later in detail. The payload 22 establishes a radio link 36 for connecting calls over a wide geographic area of coverage, or footprint, that is capable of exceeding 350 km when the airplane maintains a flight pattern at or around 30,000 feet above the ground.

In addition to the airplane 35, the airplane segment 16 also includes an airplane operations center 37 that controls mission logistics based at least in part on information from sources such as a weather center 38, and manages all system airplanes, as the system preferably includes three airplanes to ensure continuous coverage. The airplane also receives additional routine instructions from sources such as an air traffic control center 40.

Figure 2:
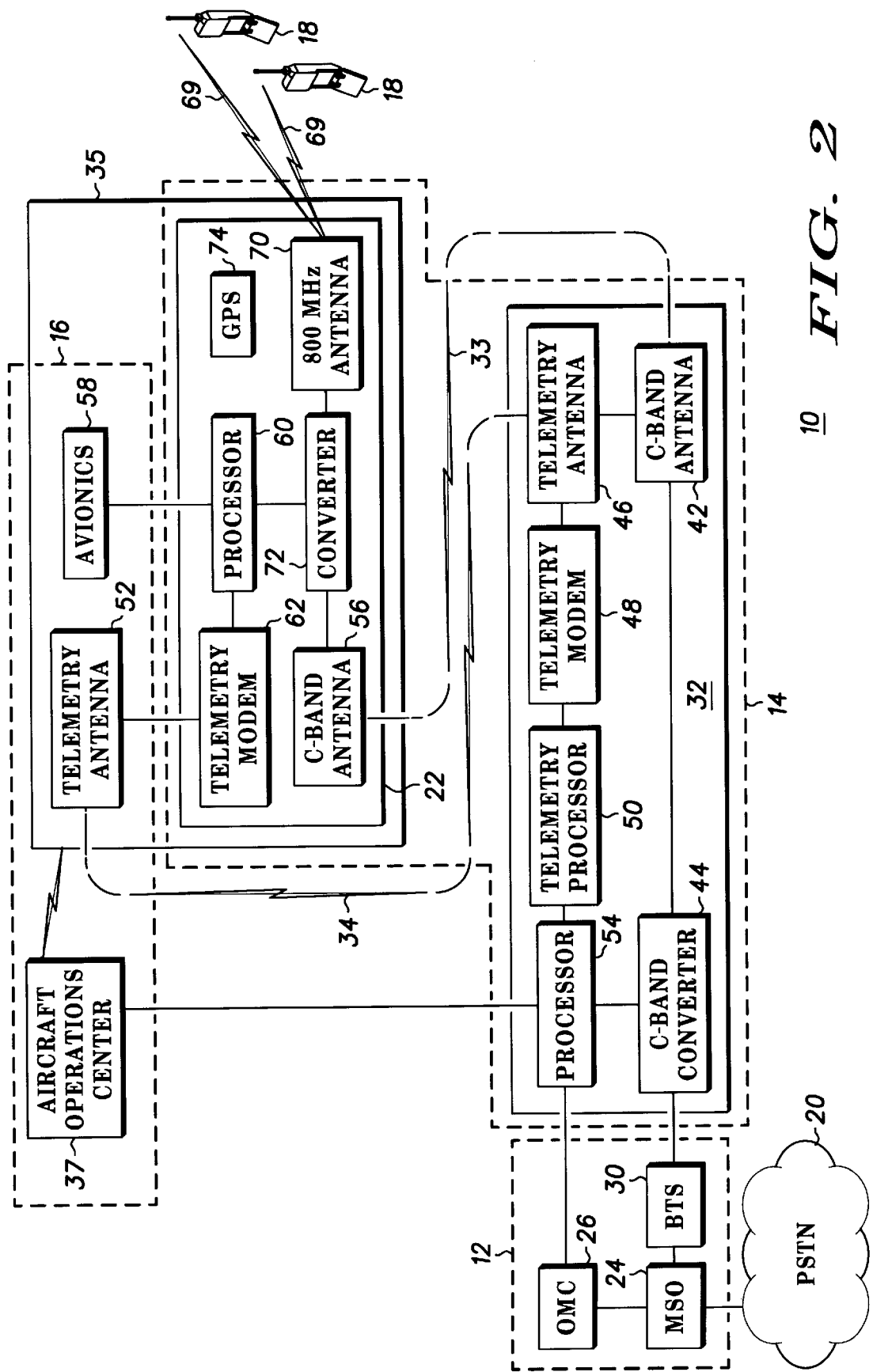
FIG. 2 is a block diagram illustrating the components of the airborne cellular communications system shown in FIG. 1 in more detail.

FIG. 2 shows certain components of the system 10 in more detail. Specifically, the ground converter equipment 32 includes a C-band antenna 42 for receiving/transmitting signals from/to the payload 22 (a second antenna is also provided for redundancy purposes), and a C-band converter 44 for appropriately converting the signals received from or to be transmitted to the payload 22. According to a preferred embodiment, the C-band antenna 42 and the converter 44 enable 800 MHz airborne cellular antennas 70 to communicate with the BTSs 30a, 30b via an established downlink, or feeder link, 33, and the converter 44 upconverts nominal signals from the BTSs 30a, 30b to C-band signals before the signals are transmitted to the airplane 35. Also, each BTS 30a, 30b is assigned a different band in the C-band spectrum so that signals from the different BTSs 30a, 30b can be separated and routed to the correct antenna, such as the antenna 56, at the payload 22. In addition, the ground control equipment 32 includes telemetry components such as a telemetry antenna 46, a telemetry modem 48 and a telemetry processor 50 to receive and process airplane data transmitted from an airplane telemetry antenna 52, while a processor 54 controls transmission of the processed telemetry data to the OMC 26 and the airplane operations center 37.

In the airplane segment 16, the airplane telemetry antenna 52 mentioned above transmits airplane avionics data generated by airplane avionics equipment, represented generally at 58, including airplane location, direction and flight pattern data as well as other data such as airplane pitch, roll and yaw data. The data from the airplane avionics equipment 58 is input into and processed by a payload processor 60 before being output to the telemetry antenna 52 through a telemetry modem 62. The payload processor 60 is also responsible for processing signals transmitted to and received from the ground converter equipment 32 through the feeder link 33 established between the C-band antennas 42, 56 and for processing signals transmitted to and received from the system users 18 through a downlink, or user link, 69 established between the users 18 and a payload downlink antenna such as an 800 MHz antenna 70, with the signals received by and transmitted from the payload being appropriately upconverted or downconverted by an 800 MHz converter 72. The payload 22, in addition to including the above-mentioned equipment, also includes GPS equipment 74 that can also be input into the processor 60 and transmitted to the ground converter equipment 32 or to the airplane operations center 37 for flight control and/or monitoring purposes. The components shown in the airplane and in the payload together form the airplane repeater that enables cellular coverage to be provided to a large geographic area that may otherwise not support terrestrial cellular coverage due to an insufficient number of cell stations or the like.

As should be appreciated from the system configuration shown in FIGS. 1 and 2, both the airborne cellular system 10 and conventional terrestrial cellular systems appear identical to the PSTN 20 and the system users 18. In other words, there are no discernable service-related differences between calls linked to the PSTN 20 through the cellular infrastructure, radio infrastructure and airplane segments 12–16 and calls handled through a conventional terrestrial system infrastructure, in part due to the fact that the cellular infrastructure segment 12 includes a standard telephony switch in the MSO 24 and BTSs 30a, 30b that are identical or nearly identical to those included in a conventional terrestrial system infrastructure.

Still referring to FIGS. 1 and 2, operation of the components of the airborne cellular system 10 during completion of a call made by one of the system users 18 will now be described. The airplane 35 when on-station preferably flies in a circular or near circular flight pattern (although the flight pattern may vary according to specific weather and coverage conditions) to provide coverage to a predetermined geographic area during a mission. While it is on-station, the airplane maintains contact with the ground converter equipment 32 to provide both the feeder link 33 and the user link 36 for the cellular infrastructure segment 12 through the radio infrastructure equipment segment 14. The airplane 35 also transmits a predetermined number of communications beams, such as, for example, 13 beams, over the coverage area, with each beam being assigned to a sector of one of the BTSs 30a, 30b and having its own set of control and traffic channels to carry signaling and voice data between the system users 18 and the cellular infrastructure segment 12. As the airplane 35 moves in its flight pattern, the beams radiated from the airplane rotate. Therefore, the system users 18 will "see" a different beam every 45 seconds or so and the cellular infrastructure segment 12 performs a sector to sector handoff of the call to keep the call from being dropped.

When initiating a call, a system user, such as one of the users 18, utilizes the control channels in the beam to signal the MSO 24 to request a call setup. The request is sent from a handset of the user 18 to the airplane payload 22, and then is relayed to the ground converter equipment 32. The ground converter equipment 32 relays the request to the corresponding BTS, such as the BTS 30a. The BTS 30a then transmits the request to the MSO 24, which sets up the call with the PSTN 20. The payload 22 therefore simply extends the physical layer of the BTS 30 to the users 18 to allow a much wider area of coverage than would typically be provided by a conventional terrestrial system, and with less associated infrastructure buildout cost. The airborne system 10 is therefore specifically useful for providing temporary cellular coverage for special events areas, where coverage is only needed for several days, thereby eliminating the need and cost associated with erecting cell stations and then tearing the cell stations down after the special events end.

Once the call setup is completed, voice communication with the PSTN 20 through the traffic channels in the beam is initiated, and voice information is then relayed in the same manner as the signaling information. When the call ends, a signal is sent to the MSO 24 to tear down the call, the handset of the user 18 releases the traffic channel used for voice communications, and the channel is returned to an idle state.

Figure 3:
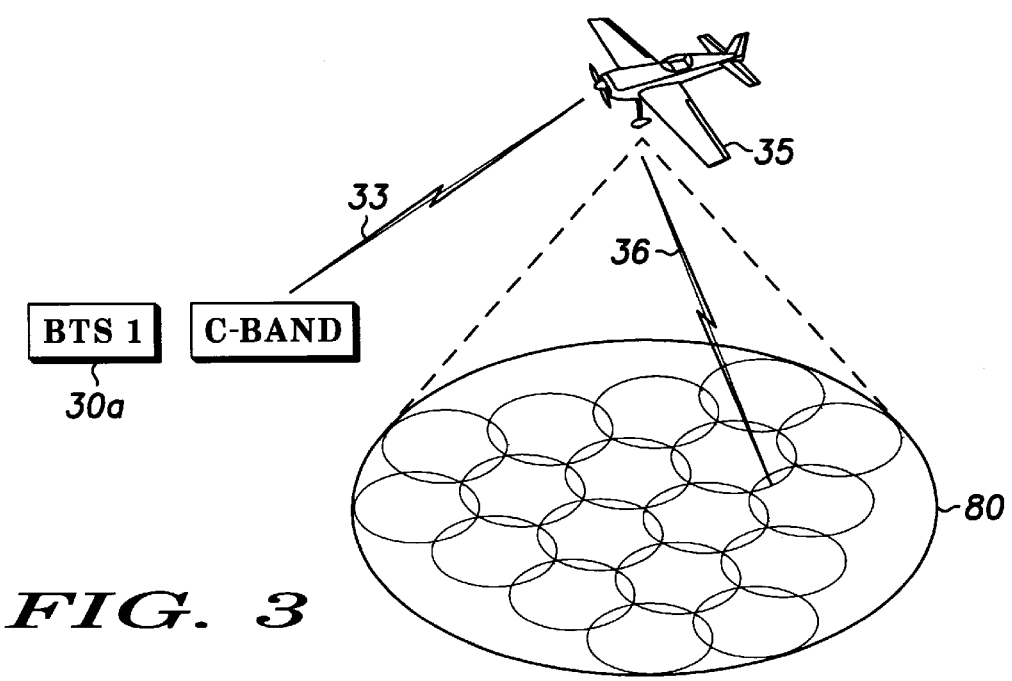
FIG. 3 is a diagram illustrating how and where Doppler shift is generated in the system shown in FIG. 1.
Figure 4:
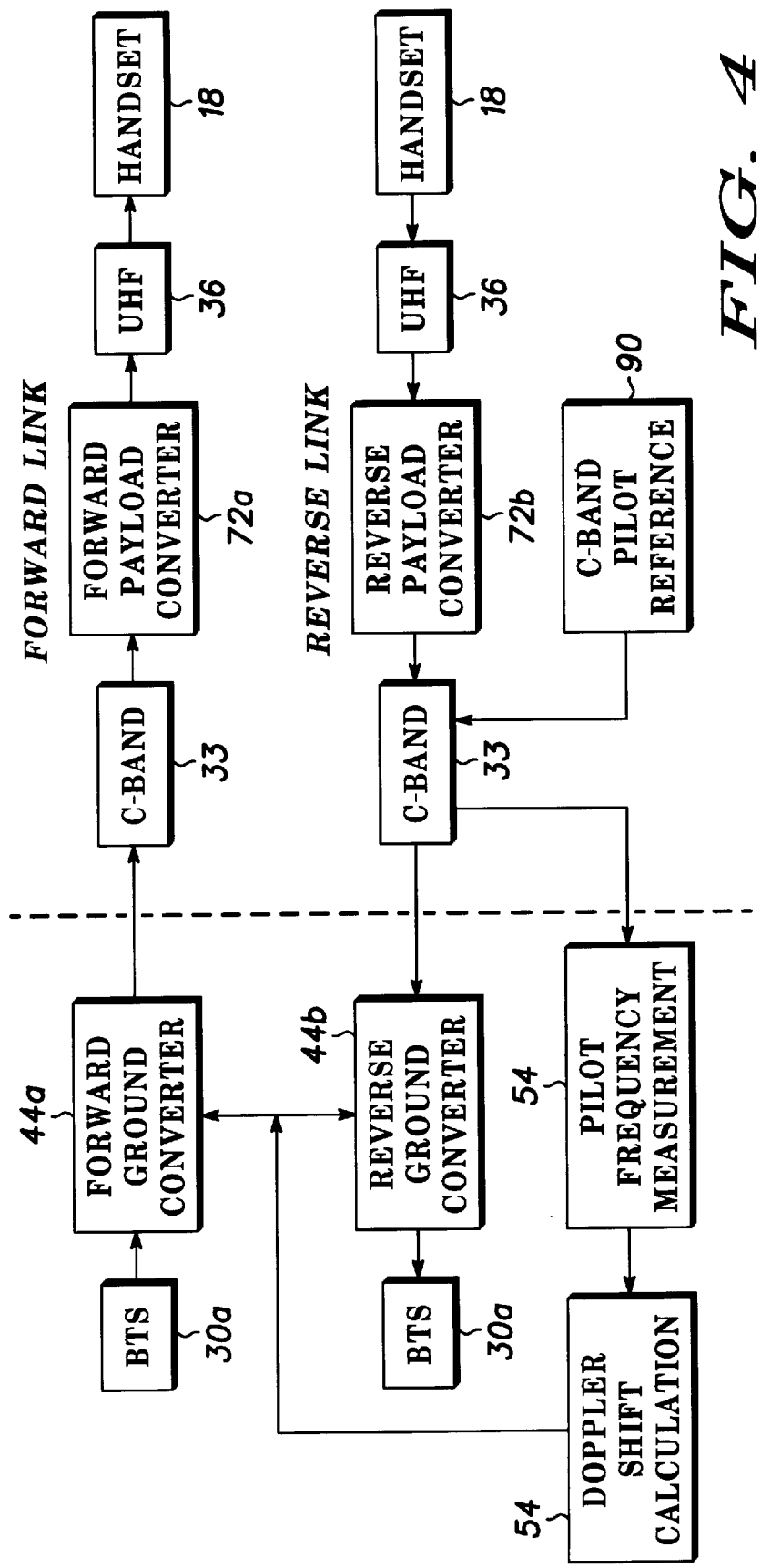
FIG. 4 is a block schematic diagram of the components utilized to correct the Doppler shift shown in FIG. 3.

Referring to FIGS. 3 and 4, correction of a Doppler shift that is introduced in both forward and reverse, user and feeder links due to airplane motion will now be discussed with respect to a preferred embodiment in accordance with the present invention. Feeder link Doppler shift varies over time with the speed and direction of the airplane with respect to the ground converter equipment 32, and may be either positive (when beams are headed toward the airplane or the distance from the airplane to the converter equipment is decreasing) or negative (when beams are headed away from the airplane or where the distance from the airplane to the converter equipment is increasing) as the airplane 35 executes its flight pattern. As the Doppler shift is proportional to the center frequency of the signal being transmitted, the Doppler shift in the system 10 will be significant. User link Doppler shift is smaller and relatively constant on a per beam basis. In other words, airplane velocity-induced Doppler shift within a beam tends to be similar for all users covered by the beam. As will now be described, the present invention is capable of correcting for both feeder link and user link Doppler to ensure continuous coverage is maintained over the designated geographic area.

Referring to the forward link including both forward feeder and user links, the BTS 30*a* transmits a signal to a forward ground converter 44*a*, which is a component of the ground converter 44. The forward ground converter 44*a* steps the signal to a higher C-band frequency before the signal is transmitted over the feeder link 33 by the C-band antenna 42 (FIG. 2). As shown in FIG. 4, the C-band antenna is part of the forward payload converter 72*a*, which in turn is a component of the 800 MHz converter 72. Time-varying Doppler shift is typically induced on the feeder link due to the movement of the airplane 35 with respect to the base station 30*a*. The forward payload converter 72*a* then converts the C-band frequency signal back to a UHF frequency before the signal is transmitted by the antenna 70 (FIG. 2) to a handset of the user 18 through the user link 36.

As shown in the reverse link in FIG. 4, which includes both reverse feeder and user links, the handset of the user 18 in return communicates with the cellular infrastructure segment 12 in FIG. 1 by transmitting a UHF signal back to the antenna 70 (FIG. 1) through the reverse user link 36. A reverse payload converter 72*b*, which is a component of the converter 72 and which includes the C-band antenna 42, then steps up the signal to the C-band before sending the signal to the reverse ground converter 44*b* through the reverse feeder link 33. The reverse ground converter 44*b*, which is also a component of the converter 44, then converts the signal back to a UHF signal before the signal reaches the BTS 30*a*.

In a preferred embodiment in accordance with the present invention, in addition to the above airborne cellular system protocol, a C-band pilot reference signal is generated at 90 by the processor 60 and is transmitted over the antennas 56, 42 to the processor 54. Preferably, the C-band pilot reference signal is a signal in a guard band between cellular communications channels. The processor 54 precisely measures the frequency of the received pilot signal. As both the airplane and all ground converters use precise frequency references, such as, for example, GPS-based references, and as the frequency of the pilot signal is known, the measured frequency can be compared to the known transmitted frequency to calculate feeder link Doppler shift. After the amount of Doppler shift in the pilot reference signal is determined, the processor 54 transmits an error correction value based on the calculated Doppler shift to the reverse ground converter 44*b* to enable the reverse ground converter 44*b* to correct for the Doppler shift in the C-band signal received from the antenna 42 based on the error correction value.

In addition, the processor 54 also determines the Doppler correction value for the forward ground converter 44*a* based on the frequency difference between the forward and reverse feeder links. The forward ground converter 44*a* then provides a forward-looking shift to the stepped-up C-band signal before the Doppler shift occurs on the feeder link 33. Therefore, the forward ground converter 44*a* pre-compensates for the Doppler shift that occurs in the feeder link 33 based on the Doppler shift present on the transmitted pilot frequency reference signal.

While Doppler shift is determined above based on a pilot frequency reference signal generated by and transmitted from the processor 60, it should also be appreciated that an airplane telemetry signal generated by the processor 60 and transmitted from the telemetry antenna 52 may alternatively be used by the processor 54 to calculate Doppler shift associated with signals transmitted over the user link 69. In this case, the Doppler shift is calculated based on telemetry data from the aircraft containing its position and velocity vector, or other information as suitable for calculating aircraft motion induced Doppler shift. Also, the Doppler shift and error correction value calculations may alternatively be performed by the processor 60 in the airplane 35 rather than by the processor 54 on the ground.

As mentioned above, the present invention also compensates for Doppler shift on the forward and reverse user links. Each communication beam in the system 10 uses a different sub-band of the feeder link. As Doppler shift on the user link cannot be calculated exactly because the location of each user is not exactly known, Doppler correction is applied by the forward and reverse ground converters 44*a*, 44*b* for each beam by taking into account the expected, or average, Doppler shift of the user links on a per beam basis and based on the fact that Doppler shift characteristics of each beam are determined by the beam pointing direction relative to the velocity vector of the airplane. These calculations are performed either terrestrially in the ground converter equipment 32 or alternatively in the airplane 35 by the processor 60.

As a result, the present invention is capable of precisely correcting for feeder link Doppler shift and of correcting for user link Doppler shift on an average basis in each subscriber beam. It should be appreciated, however, that user link Doppler shift correction can alternatively be performed in accordance with the present invention by determining the exact location of each user within the coverage area of each beam to exactly remove Doppler shift, if such precision is required by system parameters and if the additional equipment and system costs necessary to perform the required calculations are within budgetary parameters.

Figure 5:
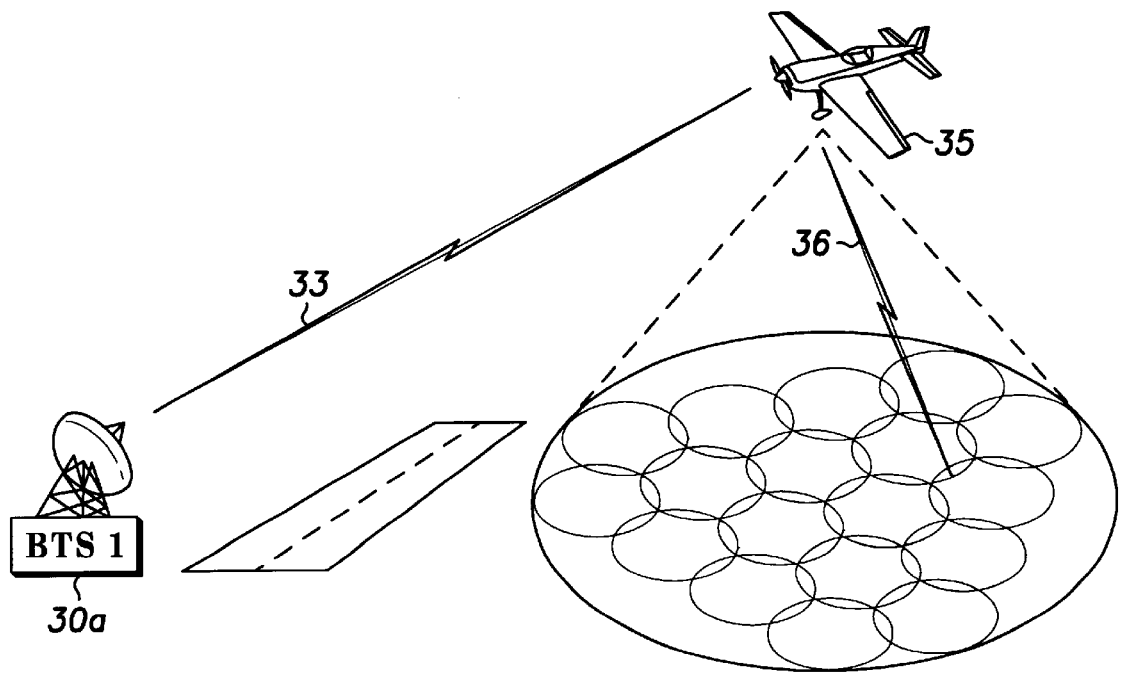
FIG. 5 is a diagram showing the system of FIG. 1 providing uninterrupted coverage over a predetermined geographic area due to signal path loss compensation provided in accordance with the present invention.

Referring to FIG. 5, a method of compensating for communications signal path loss variations on the forward feeder link according to another preferred embodiment in accordance with the present invention will now be discussed. Specifically, as the airplane 35 executes its predetermined flight pattern, the distances between the airplane 35, the BTS 30*a* and the users 18 vary, therefore causing the signal path loss to vary. In addition, airplane pitch, roll and yaw often can move beams from the airplane repeater off of their respective peak gains.

In view of the above, the present invention provides for pre-compensation of forward feeder link beam path loss by either (1) using telemetry data including airplane position data to calculate the expected path loss before adjusting the forward ground converter 44*a* to compensate for the path loss, or; (2) measuring the amplitude of the pilot signal to estimate path loss via signal measurement, and then adjusting the gain of the forward ground converter 44*a* accordingly.

Figure 6:
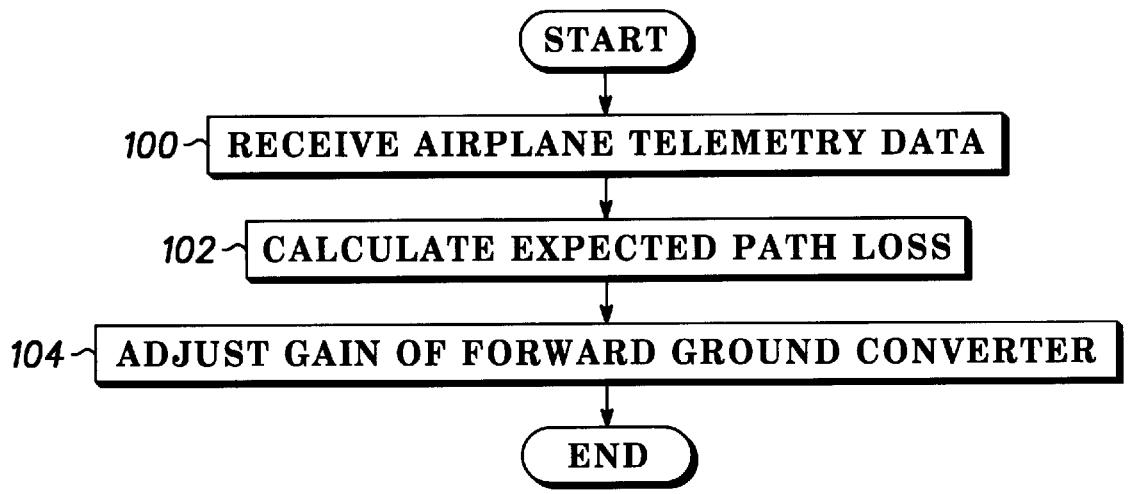
FIG. 6 is a flow diagram of a methodology for a telemetry data-based technique for pre-compensation of feeder link beam path loss.
Figure 7:
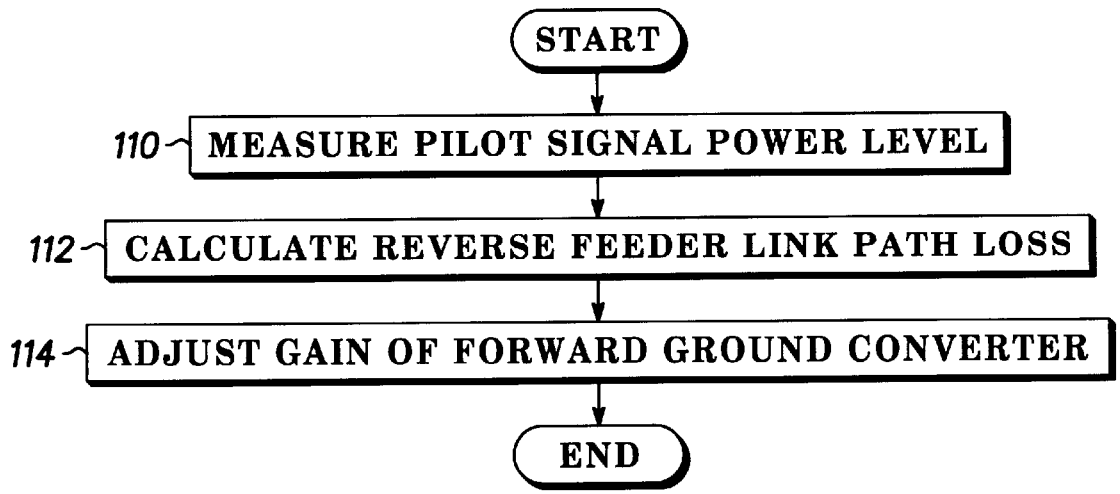
FIG. 7 is a flow diagram of a methodology for a pilot signal amplitude-based technique for pre-compensation of feeder link beam path loss.

FIGS. 6 and 7 illustrate the methodologies used to implement the above-discussed telemetry data-based and pilot signal amplitude-based path loss compensation techniques, respectively. In FIG. 6, at 100 the processor 54 receives the airplane telemetry data containing airplane position data from the airplane 35. At 102, the processor 54 calculates the expected path loss based on the distance between the airplane and a terrestrial base station such as the base station 30a. Subsequently, at 104 the processor adjusts the gain of the forward ground converter 44a based on the expected path loss to pre-compensate for feeder link path loss.

It should be noted at this point that it is also typically important to pre-correct the reverse feeder link signal, as such a correction will improve the dynamic range of an AGC (not shown) included in the BTSs. Such a pre-correction can be performed on the ground using a pilot signal such as the pilot reference signal 90 or in the airplane 35 using airplane telemetry data. Performing such pre-correction is preferably performed in the airplane, however, because overall airplane power consumption is reduced, as, for example, antenna transmitting power is scaled back when the airplane is near the ground converter equipment 32.

The methodology for the pilot signal amplitude-based path loss compensation technique is shown in FIG. 7. At 110, the processor 54 measures the power level of the received pilot signal generated by the airplane on the reverse link and transmitted to the reverse ground converter 44b. Next, at 112 the processor 54 calculates the reverse feeder link path loss and uses the calculated value to calculate forward link path loss. At 114, the gain of the forward converter 44a is adjusted based on the calculated forward feeder link path loss.

According to an alternate embodiment in accordance with the present invention, an automatic gain control circuit may be implemented in the airplane payload to remove antenna pointing error effects on gain that cannot be calculated based on airplane position. The AGC would operate by measuring the power level on a single control channel transmitted by a BTS and adjusting the gain so that the power level as measured at the antenna 52 of that control channel is constant. Additionally, all path loss compensation calculations may be performed by the processor 60 in the airplane 35 rather than through a terrestrial-based operation.

Further, although the above discussion was directed to only path loss compensation on the feeder link, the present invention may also be used to compensate for forward and reverse user link path losses, although it is contemplated that such losses will typically be handled at the handsets of the users 18. Regardless of the implementation, the link path loss compensation techniques of the present invention minimize the required system dynamic range and therefore minimize system cost and power requirements.

While the above description is of the preferred embodiment of the present invention, it should be appreciated that the invention may be modified, altered, or varied without deviating from the scope and fair meaning of the following claims.

What is claimed is:

1. A method of factoring out signal errors in both forward and reverse links, each including a feeder link and a user link, in a cellular communications system including an airborne repeater, comprising:

receiving a reverse link pilot reference signal in a band similar to a communications signal band;

correcting for Doppler shift in the reverse link based on the reverse link pilot reference signal;

correcting for the Doppler shift in the forward link based on the reverse link pilot reference signal prior to the forward link being affected by the Doppler shift by pre-compensating for forward link path losses due to movement of the airborne repeater to cause communications signals transmitted from the airborne repeater via the forward link to have substantially uniform strength; and wherein the correcting for the Doppler shift in the forward link comprises shifting the forward link prior to transmission thereof to provide coverage to a predetermined geographic area.

2. The method of claim 1, wherein the correcting for Doppler shift in the reverse link based on the reverse link pilot reference signal compensates for movement of the airborne repeater relative to terrestrial cellular telephone communicating through the repeater via the reverse link.

3. The method of claim 1, wherein the correcting for the Doppler shift in the forward link based on the reverse link pilot reference signal provides forward-looking compensation for movement of the airborne repeater.

4. The method of claim 1, wherein the reverse link and forward link are C-band links.

5. The method of claim 4, wherein the reverse link pilot reference signal is one of a C-band signal and a guard band signal adjacent C-band communications signals transmitted over the reverse link.

6. The method of claim 1, wherein the correcting for the Doppler shift in the reverse link and the correcting for the Doppler shift in the forward link comprise:

measuring a frequency difference in the reverse link pilot reference signal when received and the reverse link pilot reference signal when transmitted to determine an error correction value;

correcting for the Doppler shift in the reverse link based on the error correction value; and correcting for the Doppler shift in the forward link communication signal based on the error correction value.

7. The method of claim 6 wherein the measuring of a frequency difference in the reverse link pilot reference signal when received and the reverse link pilot reference signal when transmitted to determine an error correction value is based on GPS measurements.

8. A cellular communications system, comprising:

a terrestrial base transceiving station including a telephony switch;

an airborne repeater for providing both a forward link between the base transceiving station and system users within a predetermined geographic area of coverage, and a reverse link between the system users within the predetermined geographic area of coverage and the base transmitting station;

a forward link ground converter for stepping up signals transmitted from the base transmitting station to the airborne repeater;

a reverse link ground converter for stepping down signals transmitted from the system users to the airborne repeater;

a frequency shift correction device for determining and compensating for a Doppler frequency shift in tile reverse link by calculating an error correction value and feeding the error correction value to the reverse link ground converter via a closed feedback loop; and wherein the frequency shift correction device comprises all airplane telemetry link between the airborne repeater and the base transceiving station that facilitates calculation of an airplane speed value used as the error correction value; and wherein the frequency shift correction device is configured to correct for the Doppler shift in the forward link based on the reverse link pilot reference signal prior to the forward link being affected by the Doppler shift by pre-compensating for forward link path losses due to movement of the airborne repeater to cause communications signals transmitted from the airborne repeater via the forward link to have substantially uniform strength.

9. The cellular communications system of claim 8, wherein the frequency shift correction device is also for compensating for the Doppler frequency shift in the forward link by feeding the error correction value to the forward link ground converter to factor out the Doppler frequency shift in the forward link in a forward-looking manner.

10. The cellular communications system of claim 8, wherein the frequency shift correction device comprises:
   a pilot frequency generator for generating a pilot frequency signal for use in determining the Doppler frequency shift in the forward and reverse links;
   a pilot frequency measurement device for measuring a frequency of the pilot frequency signal received thereat;
   a Doppler shift calculator for calculating the error correction value by determining a frequency difference in the pilot frequency signal received at the pilot frequency measurement device and the pilot frequency signal generated at the pilot frequency generator, and for subsequently transmitting the error correction value to the forward link ground converter via the closed feedback loop.

11. The cellular communication system of claim 8, wherein the frequency shift correction device is an airplane-based device.

12. The cellular communication system of claim 8, wherein the frequency shift correction device is a terrestrial device.

13. A method of compensating for signal strength variations due to changing flight pattern positions of an airborne cellular communications system repeater, comprising:
   detecting a flight pattern position of an airplane carrying the cellular communications system repeater;
   pre-compensating for forward link path losses due to movement of the airplane carrying the cellular communications system repeater to cause communications signals transmitted from the cellular communications system repeater via the forward link to have uniform strength; and
   transmitting the uniform strength communications signals to the system user cell phones within the area of coverage after the pre-compensating for forward link path losses.

14. The method of claim 13, wherein the detecting of a flight pattern position of an airplane carrying the cellular communications system repeater is performed using at least one of global positioning satellite information and telemetry link information.

15. The method of claim 13, wherein the pre-compensating for forward link path losses is further for increasing or decreasing gain of the forward link to maintain a required minimum link margin.

16. The method of claim 13 wherein the pre-compensating for forward link path losses is one of an airborne operation and a terrestrial-based operation.

17. The method of claim 13, wherein the pre-compensating for forward link path loses comprises pre-compensating for forward feeder link path losses.

* * * * *

UNITED STATES PATENT AND TRADEMARK OFFICE
CERTIFICATE OF CORRECTION

PATENT NO. : 6,675,013 B1
DATED : January 6, 2004
INVENTOR(S) : Jonathan H. Gross et al.

It is certified that error appears in the above-identified patent and that said Letters Patent is hereby corrected as shown below:

Column 8,
Line 62, delete "all" and insert -- an --.

Signed and Sealed this

Twenty-eighth Day of September, 2004

JON W. DUDAS
*Director of the United States Patent and Trademark Office*